April 27, 1954 — L. C. FRAZIER — 2,676,637
TIRE CARCASS AND METHOD OF MAKING SAME
Filed March 7, 1950 — 2 Sheets-Sheet 1
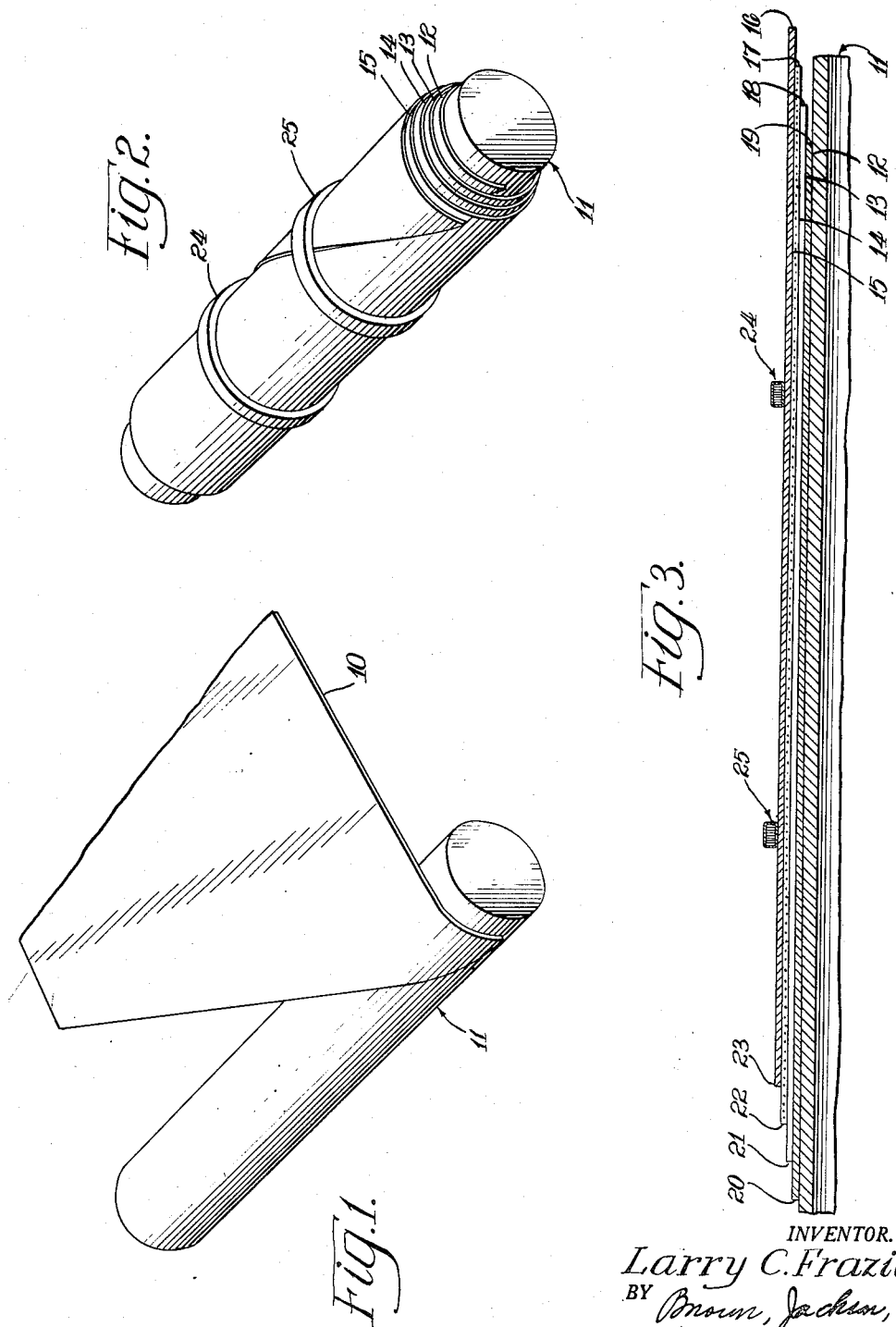
INVENTOR.
Larry C. Frazier
BY  Brown, Jackson,
Boettcher & Dienner
Attys.

April 27, 1954 L. C. FRAZIER 2,676,637
TIRE CARCASS AND METHOD OF MAKING SAME
Filed March 7, 1950 2 Sheets-Sheet 2
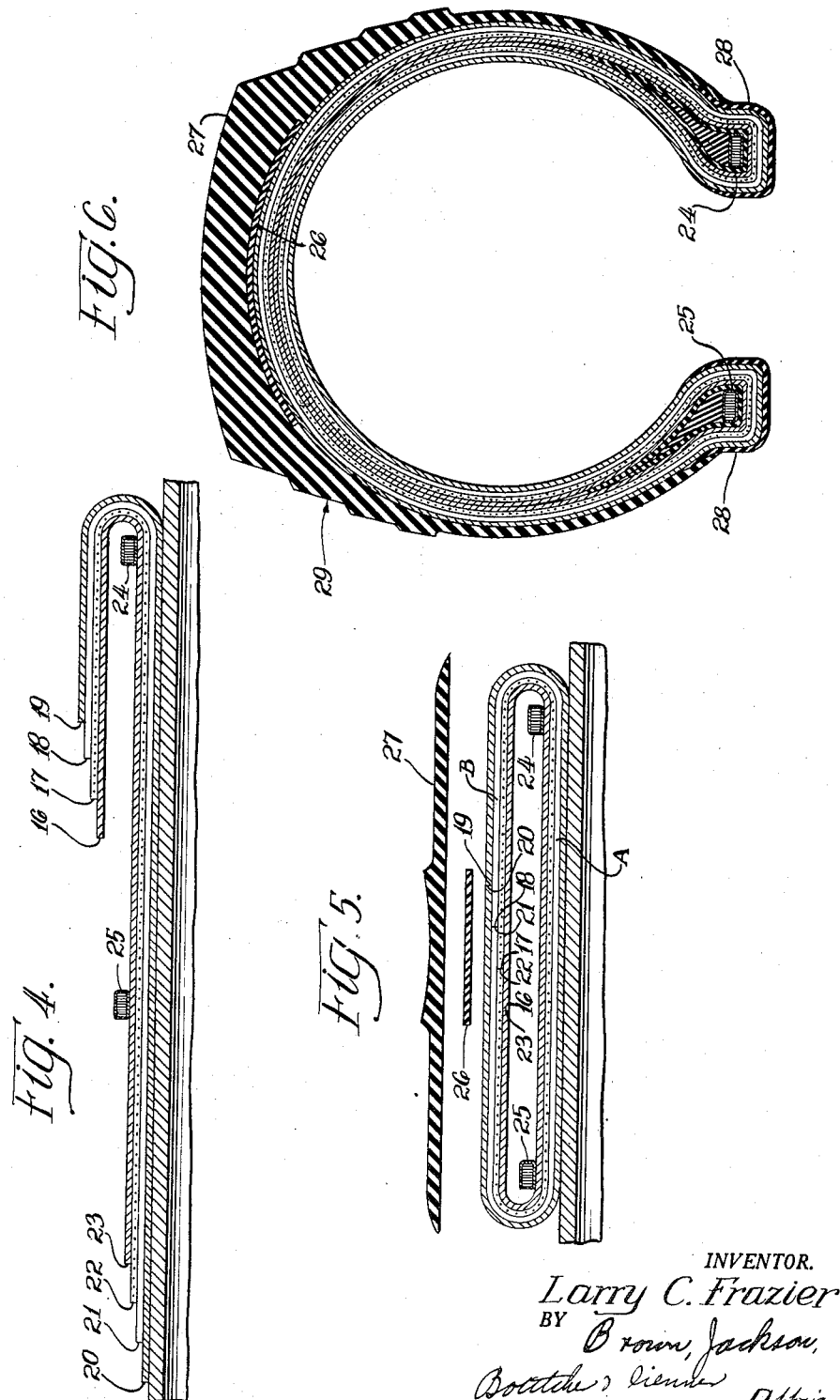
INVENTOR.
Larry C. Frazier
BY Brown, Jackson,
Boettcher & Dienner
Attys Patented Apr. 27, 1954

2,676,637

UNITED STATES PATENT OFFICE 2,676,637

TIRE CARCASS AND METHOD OF MAKING SAME

Larry C. Frazier, Niles, Mich., assignor to National-Standard Company, Niles, Mich., a corporation of Michigan Application March 7, 1950, Serial No. 148,221

5 Claims. (Cl. 152—354)

My present invention relates to an improvement in tire construction, and more particularly to an improvement over the tire construction shown in my prior application Serial No. 147,704, filed March 4, 1950, entitled "Tire Construction," now abandoned.

My invention has special significance with reference to the construction of a tire carcass which may be finished in a conventional manner to provide a completed tire casing for use with automotive vehicles or the like.

It is conventional practice in the tire building art to construct the carcass in the shape of a sleeve or band from sheet material usually referred to as "tire fabric," and it will be understood that, for purposes of the hereinafter described invention, the term "tire fabric" is intended to include any suitable material commonly employed in the tire making industry, which fabrics have fibers of a suitable strengthening material, as for example cotton, metal wire, or any of the various synthetic fibrous materials, adapted for assembly in a woven conventional manner and generally imbedded or retained in a layer of rubber or like synthetic materials to define a sheet of pliable tire fabric.

Under conventional tire making practice, presently employed in the industry today, the mounting of the bead ring assemblies on a tire carcass is usually accompanied by the folding or overlapping of a marginal portion of the tire fabric around the bead ring assemblies. This folding of the marginal portion of tire fabric is such that in the finished tire casing the marginal portions extend a short distance radially outward from the bead ring assemblies along the side walls of the tire casing so that a "hinge point" is created in the side wall of the casing. The "hinge points" are subject to flexing action in absorbing road shock which results in considerable stress and strain to the terminating points of the bead ring assembly retaining flaps and eventually results in the ultimate breakdown of the tire casing adjacent the hinge points prior to failure in other parts of the tire casing.

Briefly, my present invention contemplates the folding of a single sheet of tire fabric around the bead ring assemblies and interlapped therebetween in such a manner as will substantially eliminate the detrimental presence of side wall hinge points, and in which by the employment of a single ply of tire fabric I am enabled to construct a multi-ply tire carcass adapted for the support thereon of conventional tire tread and sidewall members.

It is an important object of my invention to provide a tire carcass construction in which the tire fabric is so folded upon itself as to avoid termination of the fabric ends along the portions of the tire carcass which will later form the sidewall members of the tire casing, formed therefrom, thereby substantially eliminating the presence of hinge points.

It is a further object of my invention to form a multi-ply tire carcass from a single sheet of tire fabric, so overlapped and folded upon itself as to have one-half the number of plies thereof reaching continuously between the bead rings and having the ends thereof terminate intermediate the bead rings adjacent the portion of the carcass which will later lie adjacent a conventional rubber tread member or the like in the crown of the tire casing.

In order to achieve the aforesaid desired objects, I propose to work a single sheet of tire fabric about a cylindrical forming drum, spirally wrapping the single sheet of fabric upon itself whereby its lateral edges will eventually lie in cascaded adjacent relationship with one another; the plied folded construction of the tire fabric resulting in a continuous cylindrical sleeve or band.

Upon completion of the spiral wrapping of the single sheet of tire fabric, a pair of bead ring assemblies may be mounted thereabout in parallel spaced relationship with respect to one another in such a manner as to be co-axially related to the central cylindrical axis of the forming drum. Additionally, the sleeve ring assemblies are located around the sleeve assembly inwardly from the opposite ends thereof a distance equal to about one-fourth of the length of the sleeve assembly and parallel with the central axis of the sleeves and forming drum but at right angles thereto.

Following the positioning of the bead ring assemblies, as described, a first one-fourth end portion of the tire fabric outwardly of one bead ring may be folded or wrapped outside inwardly over that bead ring to reach substantially half-way across the central one-half portion of the sleeve assembly or band toward the other bead ring. Thereafter, the second one-fourth end portion of the tire fabric sleeve assembly, outwardly of the other bead ring, is folded or lapped over the second bead ring and the remaining portion of the central portion lying between the two bead ring assemblies; the now adjacent cascaded edges of the sleeve assembly being adapted for interfitting in a butt joint relationship.

After the formation of the tire carcass in the manner described above, the usual and conventional additional steps for applying breakers, chafers, treads and sidewalls may be carried out, after which the completed carcass may then be formed into a tire casing by conventional and known methods.

The tire casing upon completion thereof, utilizing the aforedescribed carcass construction and arrangement of tire fabric, is characterized by having a continuous ply structure surrounding each of the bead ring assemblies with a plurality of plies of the tire fabric reaching continuously between the two bead ring assemblies and a plurality of other plies of the sleeve assemblies terminating in a cascaded butt joint intermediate the two bead ring assemblies. Such a tire carcass construction results ultimately in a tire casing distinguished by a multiple ply carcass, both along the side wall members and under the tread portion with the additional substantial elimination of all hinge points along the side wall members of the tire casing, due to the continuous layers of the tire fabric failing to terminate along the side wall members of the casing.

The above and other objects and advantages of my invention will be readily more apparent from the following detailed description.

Now, in order to acquaint those skilled in the art with the manner of constructing and utilizing a tire carcass and tire casing in accordance with my present invention, I shall describe in connection with the accompanying drawings a preferred embodiment of my invention.

In the drawings:

Figure 1 illustrates perspectively a cylindrical make-up drum and a section of a sheet of tire fabric, shown with its ends cut on the bias, which is applied to the drum in practising my invention;

Figure 2 is another perspective illustration similar to Figure 1 showing the make-up drum with a sheet of tire fabric wrapped spirally therearound and with the bead ring assemblies in place thereover;

Figure 3 illustrates diagrammatically a portion of a make-up drum in longitudinal section and showing the manner in which the tire fabric is laid about the drum to accomplish the desired plied relationship, as shown in Figure 2, in practising my invention;

Figure 4 is a view, similar to Figure 3, illustrating the folding or lapping outside inwardly of a one-fourth end portion of the tire fabric plied sleeve construction in creating the tire carcass of my invention;

Figure 5 is a view illustrating diagrammatically the folding or lapping outside inwardly of the other one-fourth end portion of the plied tire fabric construction in creating a tire carcass in accordance with my invention and positionally illustrates, in spaced relation to the folded tire fabric, a breaker strip, tread and sidewall members in relation to the tire fabric sleeve or band for application to the latter in a conventional way; and Figure 6 is a transverse cross section of a portion of a tire casing embodying my invention and formed in part by the successive steps illustrated in Figures 1 through 5.

Referring now to the drawings and particularly to Figures 1 and 2, it will be seen that my tire carcass construction, therein illustrated, comprises a sheet of tire fabric 10 having its opposite ends cut on the bias and adapted to be mounted in surrounding relation to the exterior cylindrical surface of a make-up drum 11 shown in perspective in Figures 1 and 2 and diagrammatically in Figures 3, 4, and 5, but described in detail along with an associated apparatus upon which my tire carcass may be conveniently formed, in my prior Patent No. 2,440,662 entitled Apparatus for Building Tires.

From an observation of Figure 2 it will be seen that the spiral wrapping of the single sheet of tire fabric 10 about the forming drum 11 results in a built-up ply construction shown diagrammatically in Figure 3 to form in the specific embodiment herein disclosed, four separate overlapping plies 12, 13, 14, and 15 as shown in Figure 3. It additionally will be noted that the spiral wrapping of the sheet of tire fabric 10 results in an offset edge relationship to form a cascade effect of the various plies in their overlapping relationship with one another; such cascaded edges also define a continuous spiral in their wrapped position about the forming drum 11. Looking at Figure 3 it will be seen that the right hand edge 16 of ply 15 overlaps the right hand edge 17 of ply 14, the right hand edge 18 of ply 13, and the right hand edge 19 of ply 12. Similarly the left hand edge 20 of ply 12 underlaps the left hand edge 21 of ply 13, the left hand edge 22 of ply 14, and the left hand edge 23 of ply 15 to form the cascaded effect referred to above, with each succeeding edge underlapping or overlapping the previously laid down edge of the previous ply of fabric, as the case may be.

A set of wire bead ring assemblies 24 and 25 of known and conventional type, are placed over the several plies of the tire fabric 12, 13, 14, and 15, being mounted exteriorly of the plies and the forming drum 11. It additionally will be observed that the two bead rings lie in parallel spaced relation with one another having their central longitudinal axis coinciding with the longitudinal central axis of the cylindrical make-up drum so that the two rings are aligned in concentric surrounding relation to the make-up drum and the several plies of tire fabric mounted therearound. Additionally, the two bead rings are so positioned along the length of the several plies of tire fabric that they substantially divide the carcass sleeve formed thereby into two end portions and a center portion. In the particular embodiment shown herein the right hand bead ring 24 is adapted to be placed at a distance about one-fourth along the length of the ply member 15 as measured from its right hand edge 16; likewise bead ring 25 is placed exteriorly of all the fabric plies about one-fourth the distance along the length of ply 12 as measured from its left hand edge 20.

Referring now to Figure 4 of the drawings, it will be observed that the right hand one quarter of the four ply carcass constructed, as described above, and as seen in Figure 3, is folded to the left, outside inwardly over the right hand bead ring 24 to extend partially over the central one-half portion lying intermediate the two bead rings 24 and 25.

It will be noted that in this condition the right hand cascaded edge of the carcass sleeve as defined by the four spiral wrapped plies of tire fabric, which cascade effect formerly sloped upwardly to the right in an overhanging and overlapping condition, as shown in Figure 3, now has been turned upside down so that the slope thereof, while remaining the same, is now the slope of the cascaded edge in which the several plies underlap one another so as to correspond with the left hand cascaded edge of the carcass sleeve. It should be noted further that the right hand bead ring 24 is completely overlapped by the turning over of the several carcass plies thereabout which will allow ready rotation of the plied fabric relative to the bead ring during the operational stage of forming the completed carcass into a tire casing without the necessity of utilizing a conventional step off such as was shown in my prior application of reference herein.

Observing Figures 4 and 5 it will be readily apparent that the left hand one-quarter portion of the several plies of tire fabric may now be folded outside inwardly and drawn to the right as viewed in Figure 4 to overlie the left hand bead ring 25; the cascaded edges of the left hand marginal portion of the carcass sleeve now mating with the cascaded edges of the right hand one-quarter portion of the carcass sleeve in an abutting relation to form a butt joint, with the several edges overlapping and interfitting with one another. In this connection it will be observed that, in the final folded stage as shown in Figure 5, the left hand edge 20 of ply 12 now lies in abutting relation with the right hand edge 19 of ply 12, similarly the left hand edge 21 meets with the right hand edge 18 of ply 13, the left hand edge 22 meets the right hand edge 17 of ply 14 and the left hand edge 23 meets with the right hand edge 16 of ply 15 to form a smooth spiral junction between the adjacent opposite spiral edges of the several ply layers of tire fabric located substantially in the center of the tire carcass crown.

The carcass may be completed in its mounted position on the forming drum 11 in a conventional manner by mounting thereto a conventional breaker cushion strip 26 immediately over the joint of the several plies centrally disposed between the two bead rings and exterior of the folded plies of tire fabric. A conventional rubber tire tread and side wall member 27 may be added exteriorly of the breaker cushion member, at this stage, in overlying relation with the several plies of tire fabric and breaker cushion, as well as the addition of conventional chafing strips 28, shown in Figure 6; all in a manner which is well known in the tire making industry.

It will be observed in this folded construction of the tire carcass that in the specific embodiment disclosed the single sheet of tire fabric 10 has been folded in overlapping relationship upon itself to form a carcass having a uniform eight ply sturdy construction intermediate the two bead ring assemblies.

It will be observed upon reference to Figure 5 of the drawings that, by virtue of my present invention, a tire carcass is provided which comprises an inner cylindrical sleeve, indicated at A, and outer sleeve means, shown at B, superposed with respect to sleeve A. The inner cylindrical sleeve A comprises a plurality of layers of tire fabric, four in the specific embodiment disclosed, which are circumferentially continuous and successively spirally integral with each other by virtue of being formed from a single spirally wrapped sheet of tire fabric. The outer sleeve means B, in the specific embodiment disclosed, likewise comprises four layers of tire fabric which are continuous at the opposite ends of the outer sleeve means B with the layers of tire fabric at the opposite ends of the inner cylindrical sleeve A. Each layer of tire fabric of outer sleeve means B has oppositely directed free ends, shown at 16, 23; 17, 22; 18, 21; and 19, 20; which, in the particular embodiment disclosed, are arranged in offset relation with respect to each other and in abutting end to end relation to define, in the preferred form of my invention, an outer substantially cylindrical sleeve coextensive with the inner sleeve A. Additionally the tire carcass may now be formed into a suitable tire casing 29, as shown in Figure 6, in a conventional and known manner.

It should be noted further that after the tire casing forming operation there is a continuity of plied fabrics running around each bead ring to eliminate the occurrence of hinge points along the side walls thereof, while the junction of the several adjacent spiral edges in an overlapping butt joint supplies a smooth joint of the plies in substantially the center portion of the tire crown. It will be readily apparent that the lack of hinge points in the side walls of the tire casing as well as the ability to form a multi-ply tire casing carcass from a single sheet of tire fabric with the several plies of tire fabric running in a continuous overlapping relation around the several beads to avoid hinge points results in superior tire strength and quality over the conventional and presently known tire casing constructions.

While I have herein shown what I consider to be a preferred embodiment of my tire carcass in casing construction, it will be readily apparent that equivalent constructions and modifications may be made without departing from the spirit and scope of my invention and, therefore, I do not wish to be restricted to the specific embodiment herein illustrated except as may appear in the hereinafter appended claims.

I claim:

1. A tire carcass comprising, an inner cylindrical sleeve having a plurality of circumferentially continuous and successively spirally integral layers of tire fabric, and outer sleeve means disposed in superposed relation with respect to said inner sleeve means and having a plurality of layers of tire fabric each continuous at its opposite ends with one each of the plurality of layers of tire fabric at the opposite ends of said inner sleeve means, and each of said plurality of layers of tire fabric of said outer sleeve means having a pair of oppositely directed free edges.

2. A tire carcass comprising an inner cylindrical sleeve having a plurality of circumferentially continuous and successively spirally integral layers of tire fabric, a pair of bead rings one disposed at each of the ends of said inner cylindrical sleeve, outer cylindrical sleeve means disposed in superposed relation coextensive of said inner sleeve means and having a plurality of layers of tire fabric each continuous at its opposite ends with one each of the plurality of layers of tire fabric at the opposite ends of said inner sleeve means and enclosing the bead rings thereat, and each of said plurality of layers of tire fabric of said outer sleeve means having a pair of oppositely directed free ends disposed in abutting relation intermediate said bead rings.

3. A tire carcass comprising an inner cylindrical sleeve having a plurality of circumferentially continuous and successively spirally integral layers of tire fabric, a pair of bead rings one disposed at each of the ends of said inner cylindrical sleeve, outer cylindrical sleeve means disposed in superposed relation coextensive of said inner sleeve means and having a plurality of layers of tire fabric each continuous at its opposite ends with one each of the plurality of layers of tire fabric at the opposite ends of said inner sleeve means and enclosing the bead rings thereat, and said plurality of layers of tire fabric of said outer sleeve having oppositely directed edges characterized by said edges disposed in abutting relation intermediate said bead rings and being spirally offset with respect to each other circumferentially of said outer sleeve.

4. The method of making a multi-ply tire carcass from a single sheet of tire fabric comprising the steps of spirally wrapping a single sheet of tire fabric upon itself about a cylindrical forming drum to form a multi-ply carcass sleeve distinguished by a plurality of spirally disposed successive plies of tire fabric in overlapped relation for a major portion of the dimension thereof extending axially of the axis of the forming drum, and providing a cascaded relation of the opposite edges at the ends of the successive plies with one another; mounting a pair of bead ring assemblies in spaced apart parallel relation concentrically and externally over said sleeve inwardly of the cascaded ends thereof to thereby divide said sleeve into two end portions and a central portion, folding one of said end portions over one of said bead ring assemblies and partially over said central portion, and folding said other end portion over said other bead ring assembly and partially over said central portion to meet said first folded end portion, whereby the corresponding cascaded edges of the ends of said two sleeve end portions abut with one another in spiral relation intermediate said bead rings.

5. The method of making a multi-ply tire carcass from a single sheet of tire fabric comprising the steps of spirally wrapping a single sheet of tire fabric upon itself about a cylindrical forming drum to form a multi-ply carcass sleeve distinguished by a plurality of spirally disposed successive plies of tire fabric in overlapped relation for a major portion of the dimension thereof extending axially of the axis of the forming drum, and providing a cascaded relation of the opposite edges at the ends of successive plies with one another; mounting a pair of bead ring assemblies in spaced apart parallel relation concentrically and externally over said sleeve inwardly of the cascaded ends thereof to thereby divide said sleeve into two end portions and a central portion, folding one of said end portions over one of said bead ring assemblies and toward the other of said bead ring assemblies, and folding said other end portion over said other bead ring assembly and toward said one bead ring assembly.

References Cited in the file of this patent

UNITED STATES PATENTS

| Number | Name | Date |
|---|---|---|
| 1,581,743 | Kearns et al. | Apr. 20, 1926 |
| 1,737,415 | Gammeter | Nov. 26, 1929 |
| 1,770,895 | Abbott | July 22, 1930 |
| 1,807,909 | Gammeter | June 2, 1931 |
| 1,913,422 | Wikle | June 13, 1933 |
| 2,486,387 | Bringolf | Nov. 1, 1949 |
| 2,516,864 | Gilmore et al. | Aug. 1, 1950 |
| 2,525,070 | Greenwald et al. | Oct. 10, 1950 |

FOREIGN PATENTS

| Number | Country | Date |
|---|---|---|
| 6,052 | Norway | Feb. 21, 1898 |